United States Patent Office 3,510,611
Patented May 5, 1970

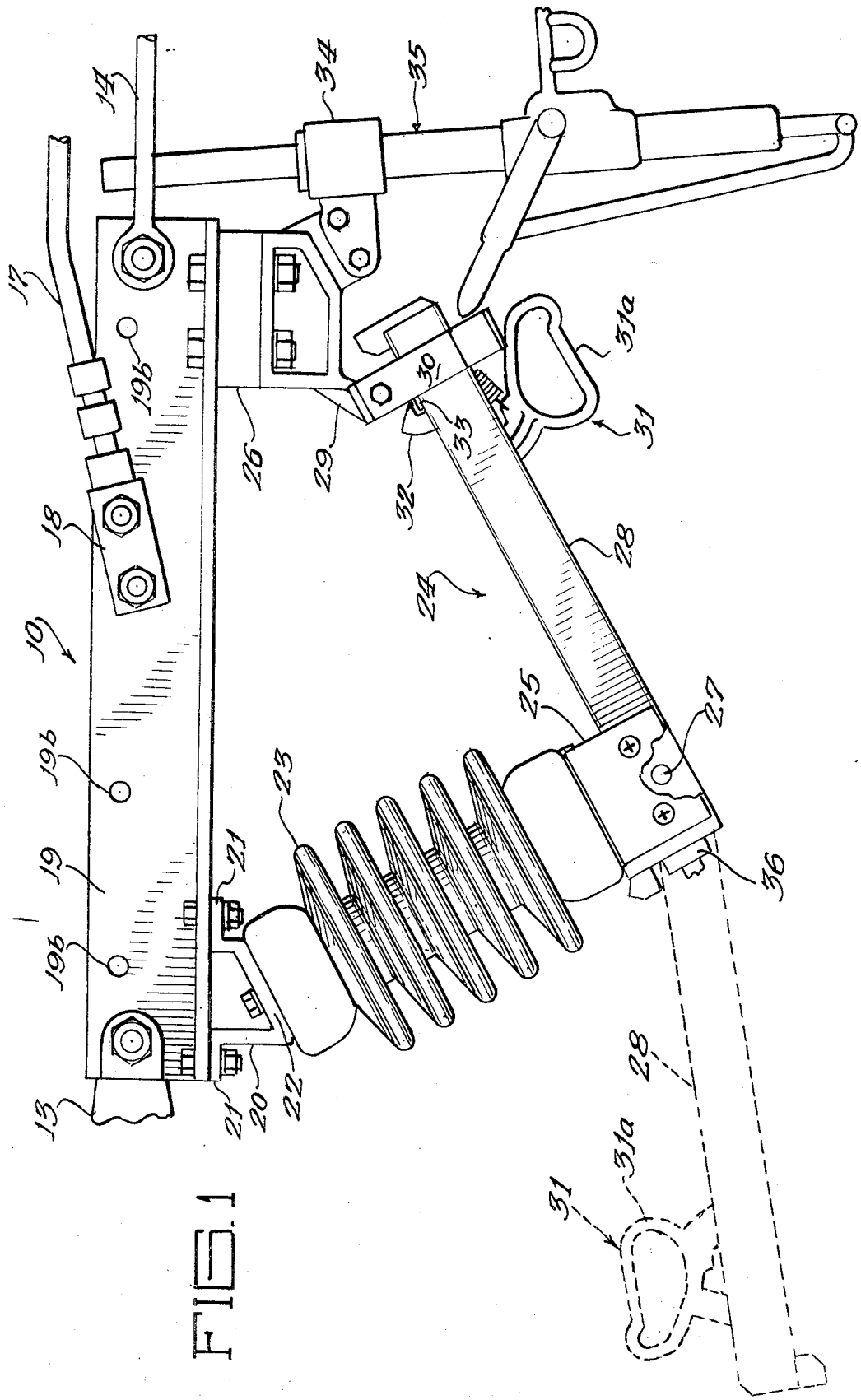

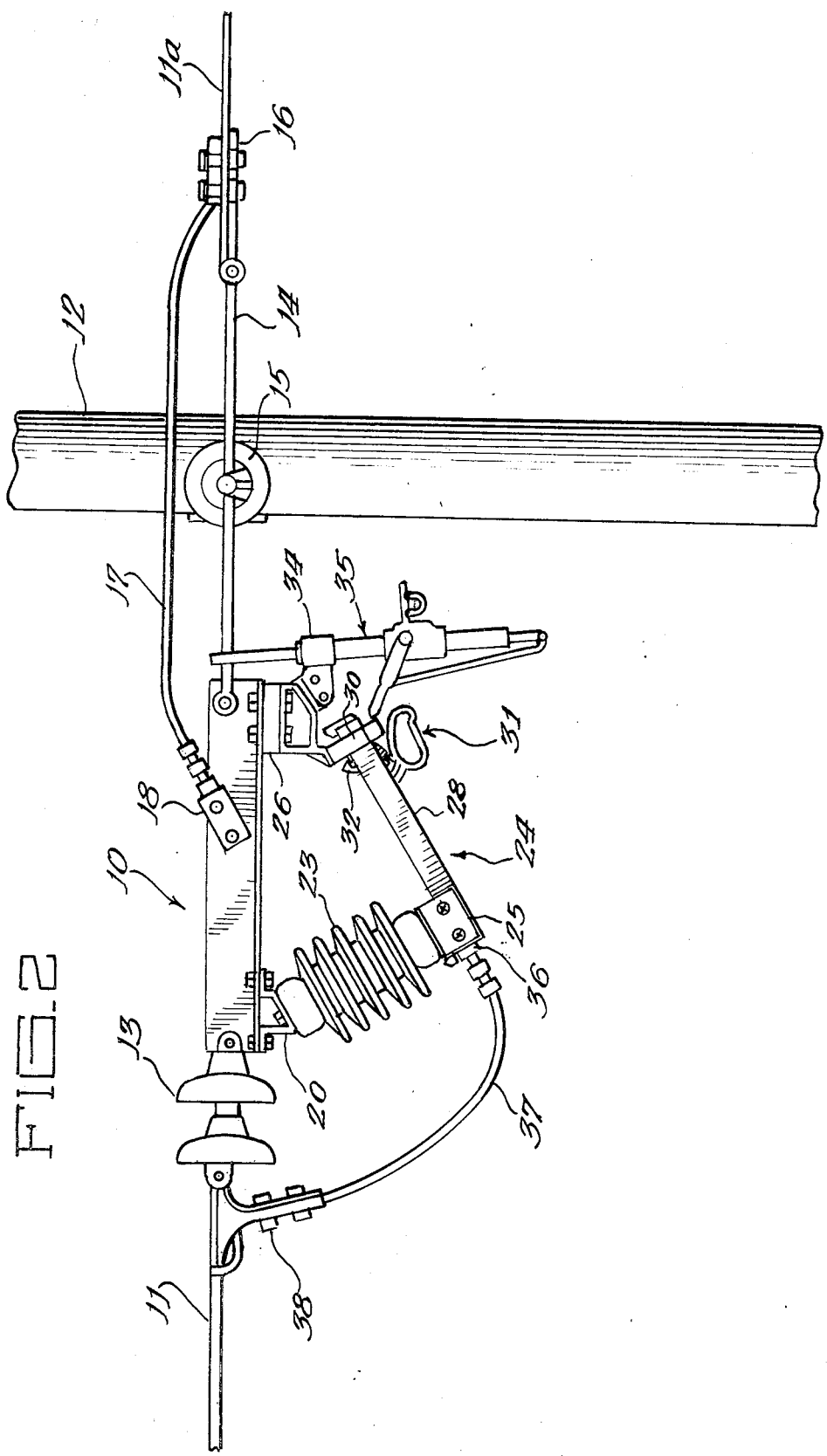

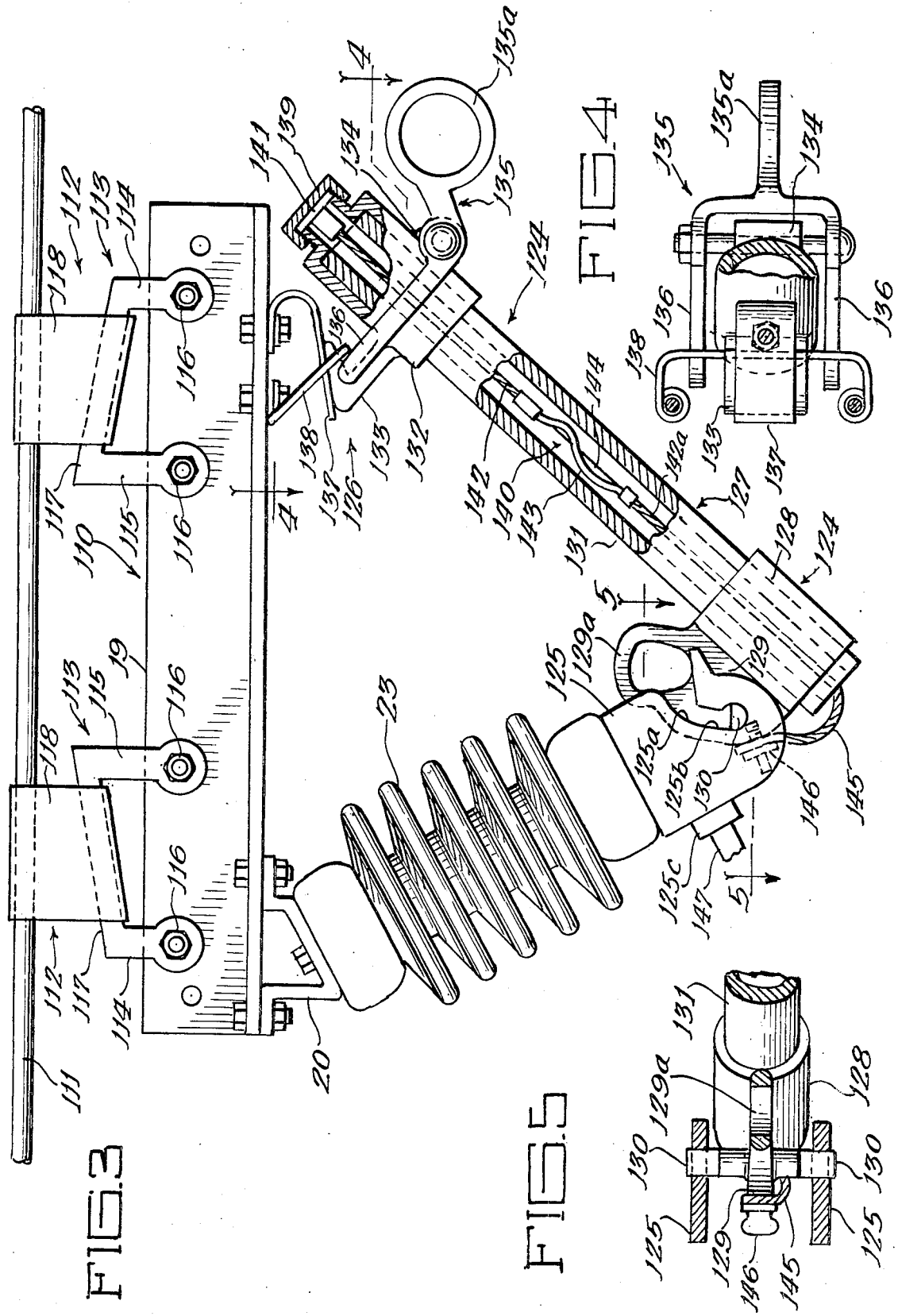

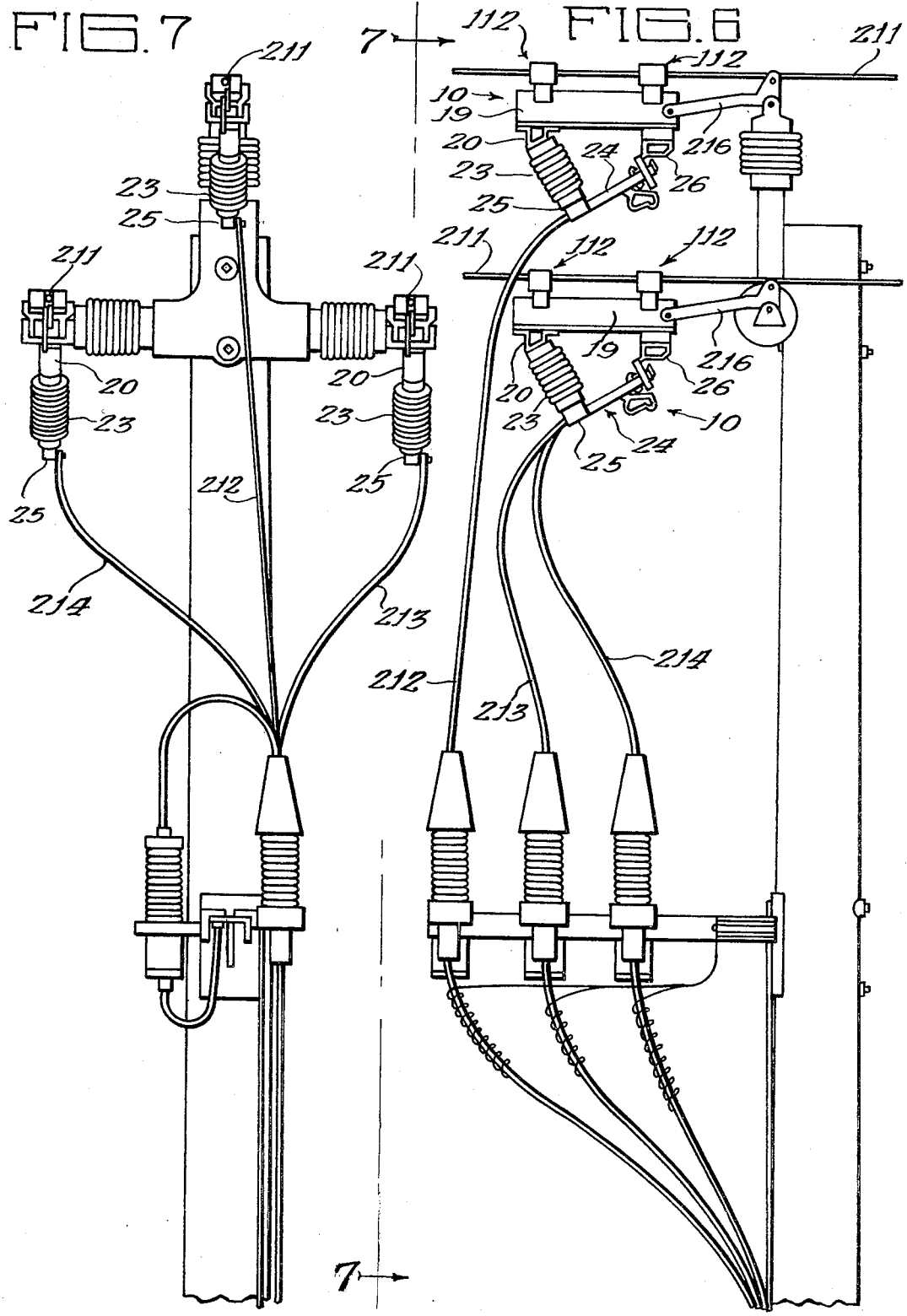

3,510,611
CIRCUIT DISCONNECT MEANS FOR
OVERHEAD ELECTRIC LINES
Ronald P. Bridges, c/o Bridges Electric, Inc., 2451 Wisconsin St., Downers Grove, Ill. 60515
Filed Nov. 29, 1968, Ser. No. 779,953
Int. Cl. H01h 31/00
U.S. Cl. 200—48
15 Claims

ABSTRACT OF THE DISCLOSURE

Circuit disconnect means for overhead electric lines which may be used to sectionalize a line, or to disconnect an underground cable rise, or for other comparable purposes, in which that part of the circuit disconnect means which is directly connected to an overhead line is formed of metal or other material which is strong in tension, permitting the use of a lightweight porcelain insulator as a support for the disconnect means. Specifically, that portion of the disconnect means which is directly connected to the overhead line comprises an aluminum bar, and a lightweight porcelain insulator is mounted at one end of the bar in an inclined position to receive the pivot end of a circuit disconnect means which has its other end directly connected to a latch bracket on the bar. The disconnect means may be either a switch or a high voltage fuse.

BACKGROUND OF THE INVENTION

In an effort to eliminate overhead cross arms and make overhead distribution systems more compact and less obtrusive, the electric power industry for many years has used a type of switch known as a line tension disconnect. Such switches are made and sold by several manufacturers, and have been in use for perhaps thirty or forty years. Prior art switches of this type place a porcelain insulator directly in tension in the overhead line, and suspend a disconnect switch beneath the insulator. This structure, however, has the great disadvantage of requiring a very heavy and expensive porcelain insulator because of the fact that porcelain has a relatively low strength in tension. Accordingly, line tension disconnects heretofore available have been inordinately expensive; and they have also been so heavy as to place an undesirable strain on an overhead electric line in which they are mounted.

The present invention eliminates the need for a heavy and expensive porcelain insulator by taking the insulator out of direct tension in the line. It also provides a versatile circuit disconnect means for overhead electric lines which may be used either as a line tension disconnect or a line suspended device.

SUMMARY OF THE INVENTION

By utilizing the specific structure heretofore briefly described in the Abstract of Disclosure, the present invention provides a greatly improved line tension disconnect means and at the same time provides a basic device of such versatility that it may be used for either mounting a disconnect switch or a high voltage fuse, and which may be used either as a line tension device or as a line suspended device.

The principal object of the present invention, therefore, is to provide improved circuit disconnect means for overhead electric lines.

Another object of the invention is to provide circuit disconnect means for overhead electric lines which may be used as a line tension disconnect, but which is much lighter weight and less expensive than conventional line disconnect devices heretofore available.

Another object of the invention is to provide a basic structure which may be used either as a line tension or a line suspended device.

Yet another object of the invention is to provide a basic device which may be either a disconnect switch or a high voltage fuse.

DESCRIPTION OF THE DRAWINGS

FIG. 1 is a side elevational view of a circuit disconnect means embodying the invention with the switch blade illustrated in broken lines in open position;

FIG. 2 is a side elevational view on a reduced scale, with the circuit disconnect means of FIG. 1 illustrated in use as a line tension disconnect switch mounted in tension in an overhead electric line for sectionalizing the line;

FIG. 3 is a side elevational view of a structure embodying the invention and used as a mounting for a high voltage fuse, the unit being illustrated as a line suspended device;

FIG. 4 is a fragmentary section on an enlarged scale taken substantially as indicated along the line 4—4 of FIG. 3;

FIG. 5 is a fragmentary section on an enlarged scale taken substantially as indicated along the line 5—5 of FIG. 3;

FIG. 6 illustrates the switch structure of FIG. 1 in use as a line suspended unit for disconnecting an underground cable riser from an overhead electric line; and FIG. 7 is an end elevational view taken substantially as indicated along the line 7—7 of FIG. 6.

DETAILED DESCRIPTION OF THE INVENTION

Referring to the drawings in greater detail, and referring first to FIGS. 1 and 2, circuit disconnect means, indicated generally at 10, is seen to be mounted in tension in an electric line 11–11a which is supported from a post 12. One end of the circuit disconnect means 10 is connected into the line 11 by means of a standard strain type porcelain insulator 13 which provide inline insulation when the disconnect means 10 is open. The other end of the disconnect means is carried by a trunnion extension 14 of an insulator mounted trunnion 15 on the post 12 which makes a connection at 16 to the side of the line 11a. A carrier line 17 which is connected to the circuit disconnect means at 18 and to the circuit connector 16 carries the bulk of the electrical load so that only a portion of it need go through the trunnion extension 14.

As best seen in FIG. 1, the disconnect means 10 comprises a base 19 which is in the form of an aluminum angle member having holes 19a (FIG. 3) at its two ends to receive attaching bolts for the strain type insulators 13 and the trunnion extension 14. Additional holes 19b are provided to receive suspension brackets of wedge type connector assemblies when the unit is to be used as a line suspended device as illustrated in FIGS. 3, 4 and 5. Beneath one end of the base 19 is an insulator bracket 20 which has mounting flanges 21 for bolting it to the base 19 and which has an inclined insulator support web 22 which supports a lightweight porcelain insulator 23. A disconnect switch structure, indicated generally at 24, is supported between the free end of the insulator 23 and the other end of the base 19.

The disconnect switch 24 includes a pivot support, indicated generally at 25, which is mounted at the free end of the insulator 23, and a contact support 26 at the other end of the base. The pivot support 25 is of generally conventional structure so as to provide a pivot 27 for a switch blade 28. The contact support 26 includes a flange 29 which carries spaced contact fingers such as the finger 30, and the fingers are provided with contact elements (not shown) which are of conventional type and make contact with matching contact elements on the switch blade 28. The switch blade 28 also has a hook stick operated latch mechanism, indicated generally at 31, which includes a pivoted latch hook 32 that releasably engages a latch strike 33 on the flange 29. No details of the switch pivot structure 25–27 or of the switch blade latch mechanism 31 are thought to be required, inasmuch as each may be of conventional construction. Also mounted on the contact support 26 is a socket member 34 to receive a cylindrical circuit interrupter member 35, the socket 34 and interrupter 35 being made in accordance with the disclosure of Bridges Pat. 3,205,330. The disconnect switch pivot bracket 25 is provided with a connector 36 for an electric bypass line 37 which is connected at 38 to the electric line 11 so that the line 37 and the disconnect switch structure 24 cooperate to provide electric conductor means bridging the insulator 23.

When for any reason it is necessary to break the circuit between the line 11 and the line 11a a hook stick may be engaged in the handle 31a of the latch mechanism 31 and pulled down to disengage the latch hook 32 from the latch strike 33 and thus swing the switch blade 28 from the closed position of FIG. 1 to the broken line open position of FIG. 1. During this movement of the switch blade 28 the circuit interrupter member 35 is operated as described in my Pat. 3,205,330.

Referring now to FIGS. 3, 4 and 5, circuit disconnect means, indicated generally at 110, is suspended from an overhead electric line 111 by a pair of conventional wedge type connector assemblies, indicated generally at 112. The structure 110, like that illustrated in FIG. 1, includes a base 19, a bracket 20 and a lightweight porcelain insulator 23.

The wedge type connector assemblies 112 include suspension brackets, indicated generally at 113, that have arms 114 and 115 with hollow bosses, 114a and 115a, respectively, to receive bolts 116 which extend through the holes 19b in the base 19; and connector bars 117 extend between the arms. Wedge connector members 118 extend around the bars and around the overhead electric line 111 to suspend the circuit disconnect means 110 from the line.

In the structure of FIG. 3 the circuit disconnect element is a high voltage fuse assembly, indicated generally at 124, which includes pivot bracket means 125 at the free end of the insulator 23, a latch and contact structure 126 which is bolted to the base 19 at the end opposite the bracket 20, and a fuse carrier structure, indicated generally at 127.

As best seen in FIGS. 3 and 4, the pivot bracket 125 is bifurcated and has a pair of aligned hook-like slots 125a which are generally upwardly open and have circular enlargements 125b at their lower ends. A fuse support collar 128 of the fuse carrier 127 has a web 129 extending into the space between the two sides of the bifurcated bracket 125, and semicylindrical studs 130 extend laterally from the web 129 into the slot 125a where, when the fuse assembly 124 is in closed circuit position, the studs 130 are seated in the circular enlargements 125b at the lower ends of the slots. A hook stick ring 129a on the web 129 permits the use of a hook stick to remove the fuse carrier structure 127 from the pivot bracket 125 when the structure is hanging vertically beneath the bracket, because in that position the semicylindrical studs 130 may slide upwardly out of the slots 125a.

Referring to FIGS. 3 and 5, the fuse carrier 127 also includes a tubular body 131, and at the end opposite the collar 128 is a latch collar 132 which includes a rigid latch hook 133 and a hollow pivot boss 134. Pivoted in the boss 134 is a bifurcated latch release element 135 that includes release fingers 136 and a ring 135a.

The latch and contact structure 126 includes a spring contact member 137 of flat stock which is bolted to the base 19, and a spring wire latch bale 138 that is also bolted to the base and has a bight portion engaged by the latch hook 133. The fuse carrier structure 127 is thus released from the contact and latch assembly 126 by pulling down on the ring 135a to pivot the latch release element 135 and cause its fingers 136 to flex the bale 138 and thus release the latch hook 133.

The fuse carrier structure 127 includes a threaded cap 139 which screws onto a flange on the latch collar 132 and makes firm electric contact with a fuse element, indicated generally at 140, which includes a head flange 141, conductor wire means 142–142a connected by a fusible element 143, a fine connector wire 144, and a pigtail 145 that extends out of the bottom of the member 131 and connects to a thumb screw 146 (FIG. 5) on the web 129. An electric circuit which may be from a line tap (not shown) extends through a connector lead wire 147 to a connector nipple 125c on the pivot bracket 125, through the bracket to the web 129, through the pigtail 145, the conductor wire means 142–142a and the fusible element 143, the head flange 141, the latch collar 132 and the spring contact member 137, the base 19, and a connector lead member (not shown) from the hole 19a at the righthand end of FIG. 3 to the overhead wire 111.

Referring now to FIGS. 6 and 7, the circuit disconnect switch structure 10 of FIG. 1 is illustrated as suspended from overhead cables 211 where it is used to provide a disconnect for a line tap such as the underground cable risers 212, 213 and 214. In this application of the disconnect switch structure the base 19 is provided with wedge connector assemblies 112 by which it is suspended from one of the overhead lines 211. The disconnect switch base 19 is electrically connected to the line 211 by a connector bar 216, and the underground cable riser 212, 213 or 214, as the case may be, is connected into the pivot bracket 25 of the disconnect switch structure 24 at the connection 36.

The fuse structure of FIGS. 3 to 5 may also be used to protect an underground cable riser, in which case it is mounted and electrically connected in the same way as is shown in FIGS. 6 and 7 for the switch structure 10.

The foregoing detailed description is given for clearness of understanding only and no unnecessary limitations should be understood therefrom, as modifications will be obvious to those skilled in the art.

I claim:

1. Electric circuit disconnect means comprising, in combination: a rigid base member of relatively high electric conductivity which is adapted to be mounted on an electric conductor line; an electric insulator mounted on a side of said base member near one end thereof; and means for electrically bridging the insulator including an electric circuit disconnect member which has one of its ends mounted on the insulator and its other end mounted directly on and electrically connected to the base member near the other end of the latter.

2. The combination of claim 1 in which the electric circuit disconnect member comprises a disconnect switch having a pivoted blade member.

3. The combination of claim 1 in which the electric circuit disconnect member comprises a high voltage fuse.

4. The combination of claim 1 in which the base member comprises an elongated metal bar, pivot means on the insulator pivotally supports said one end of the circuit disconnect member, and latch means at the other end of the bar and of the disconnect member releasably connects said ends of said members.

5. The combination of claim 4 in which the pivot means includes a bifurcated bracket provided with a pair of aligned, generally upwardly open slots, a fuse support collar has a flange extending into the bifurcation of said bracket with laterally extending pivot pins removably seated in the slots, a tubular fuse holder has one end supported in the collar, and means including a latch collar is mounted at the other end of said fuse holder.

6. The combination of claim 1 in which the base member is adapted to be mounted selectively in tension in an electric conductor line or suspended from such a line.

7. The combination of claim 1 in which the electric circuit disconnect member is inclined relative to the base.

8. The combination of claim 7 in which the insulator is inclined relative to the base and the longtudinal axis of the circuit disconnect member is substantially at right angles to the longitudinal axis of the insulator.

9. The combination of claim 1 which includes suspension bracket means on a side of the base opposite the insulator means, said bracket means being adapted to receive connectors for suspending the base member from an electric conductor line.

10. Electric circuit disconnect means comprising, in combination: a rigid bar of relatively high electric conductivity which is adapted to be mounted on an electric conductor line; a lightweight electric insulator having a first end mounted on a first side of said bar and a free end, said insulator being generally in the same plane as the bar; a pivot bracket mounted on the free end of the insulator; a first electrically conductive latch member on the same side of the bar as the insulator and near the opposite end of the bar; an electric circuit disconnect member; means pivotally mounting one end of said disconnect member in said pivot bracket; a second electrically conductive latch member on the other end of the disconnect member releasably engaging said first latch member; and means electrically connected with said one end of the disconnect member for receiving an electric conductor line which may cooperate with the disconnect member to bridge the insulator.

11. The combination of claim 10 in which the disconnect member is a switch.

12. The combination of claim 10 in which the disconnect member is a high voltage fuse.

13. The combination of claim 12 which includes a tubular fuse holder at one end of which is a first collar that carries the pivot means and at the other end of which is a second collar that supports the second latch member.

14. The combination of claim 10 which includes an insulator mounting bracket secured to the bar, said bracket having an insulator supporting portion which is inclined relative to the bar, and in which the insulator is also inclined relative to the bar.

15. The combination of claim 10 which includes suspension bracket means on a side of the bar opposite said first side, said bracket means being adapted to receive connectors for suspending the base member from an electric conductor line.

References Cited

UNITED STATES PATENTS

| | | | |
|---|---|---|---|
| 2,240,260 | 4/1941 | Hart | 337—168 |
| 2,656,435 | 10/1953 | Fahnoe | 337—170 |

ROBERT S. MACON, Primary Examiner

H. J. HOHAUSER, Assistant Examiner